United States Patent [19]
Kasari et al.

[11] Patent Number: 5,827,575
[45] Date of Patent: Oct. 27, 1998

[54] METHOD FOR FORMING A MULTILAYER TOPCOAT

[75] Inventors: Akira Kasari; Hiroaki Oda; Junichi Kajima; Mikio Shimakawa, all of Hiratsuka, Japan

[73] Assignee: Kansai Paint Company, Limited, Amagasaki, Japan

[21] Appl. No.: 729,375

[22] Filed: Oct. 17, 1996

Related U.S. Application Data

[62] Division of Ser. No. 689,663, Aug. 13, 1996.

[30] Foreign Application Priority Data

| Aug. 25, 1995 | [JP] | Japan | 7-217599 |
| Dec. 26, 1995 | [JP] | Japan | 7-338801 |
| Feb. 6, 1996  | [JP] | Japan | 8-019730 |

[51] Int. Cl.⁶ .................................................. B05D 3/02
[52] U.S. Cl. ...................... 427/380; 427/379; 427/388.2; 427/409; 427/410; 427/386
[58] Field of Search ............................ 427/379, 386, 427/409, 388.2, 410, 380

[56] References Cited

U.S. PATENT DOCUMENTS

| 5,063,114 | 11/1991 | Nambu et al. | 428/447 |
| 5,130,167 | 7/1992 | Mitsuji et al. | 427/407.1 |
| 5,332,766 | 7/1994 | Takaya et al. | 523/201 |
| 5,362,521 | 11/1994 | Ozaki et al. | 427/407.1 |
| 5,366,768 | 11/1994 | Kasuri et al. | 427/407.1 |

*Primary Examiner*—Judy M. Reddick
*Attorney, Agent, or Firm*—Armstrong, Westerman, Hattori, McLeland & Naughton

[57] ABSTRACT

The present invention provides a method for forming a topcoat which comprises applying an aqueous colored base coating composition comprising a hydroxyl- and carboxyl-containing acrylic resin, a melamine resin, an alicyclic epoxy-containing compound, a neutralizing agent, and a coloring pigment to a substrate and applying to the base coat an organic solvent type clear coating composition to be cured by the crosslinking reaction between a carboxyl group and an epoxy group.

3 Claims, No Drawings

METHOD FOR FORMING A MULTILAYER TOPCOAT

This application is a divisional application of application Ser. No. 08/689,663 filed on Aug. 13, 1996 pending.

The present invention relate to a novel aqueous colored base coating composition which is capable of forming a coating film excellent in chipping resistance, water resistance and the like, and more particularly, a novel method for forming a multi-layer topcoat comprising a colored base coat and a clear coat, the topcoat being excellent in chipping resistance, intercoat adhesion, water resistance, acid resistance, weatherability and the like.

Substrates such as automotive exterior panels are usually finished by successively forming an undercoat such as a cationic electrodeposition coat or the like, an intercoat and a topcoat. The topcoat is formed generally by a 2-coat system using a solid- or metallic-colored base coating composition and a clear coating composition.

Conventionally, for forming the topcoat, an aqueous coating composition mainly comprising a hydroxyl- and carboxyl-containing acrylic resin, a melamine resin, a neutralizing agent and a coloring pigment, and a coating composition mainly comprising a hydroxyl-containing resin and a melamine resin are chiefly used as the colored base coating composition and the clear coating composition, respectively.

However, said aqueous colored base coating composition has the drawbacks of giving a coating film which is unsatisfactory in strength and poor in chipping resistance, water resistance and the like. Further, the topcoat formed from said base coating composition and the clear coating composition mentioned above is unsatisfactory in chipping resistance, intercoat adhesion between the colored base coat and the clear coat (hereinafter referred to simply as "intercoat adhesion"), water resistance, weatherability and the like. On the other hand, it has been proposed to improve the acid resistance of the topcoat by using a clear coating composition which does not contain a melamine resin and is cured by the crosslinking reaction between a carboxyl group and an epoxy group. However, the resulting topcoat is also unsatisfactory in chipping resistance, intercoat adhesion, water resistance, weatherability and the like.

An object of the present invention is to provide a novel aqueous coating composition which is capable of forming a coating film excellent in chipping resistance, water resistance and the like.

Another object of the present invention is to provide a method for forming a multi-layer topcoat which is good in acid resistance, chipping resistance, intercoat adhesion, water resistance, weatherability and the like.

These and other objects of the invention will become apparent from the following description.

The present invention provides an aqueous colored base coating composition (A) comprising a hydroxyl- and carboxyl-containing acrylic resin (A-1), a melamine resin (A-2), an alicyclic epoxy-containing compound (A-3), a neutralizing agent (A-4) and a coloring pigment (A-5).

The present invention also provides a method for forming a topcoat which comprises applying the aqueous colored base coating composition (A) to a substrate and applying to the base coat an organic solvent type clear coating composition (B) to be cured by the crosslinking reaction between a carboxyl group and an epoxy group.

The present inventors conducted extensive research and found that a coating film excellent in chipping resistance, water resistance and the like can be formed when using, as an aqueous colored base coating composition, a composition which comprises a hydroxyl- and carboxyl-containing acrylic resin, a melamine resin, a neutralizing agent and a coloring pigment and further contains an alicyclic epoxy-containing compound. The present inventors also found that a multi-layer topcoat which is good in acid resistance, chipping resistance, intercoat adhesion, water resistance, weatherability and the like can be formed when using said colored base coating composition and an organic solvent type coating composition to be cured by the crosslinking reaction between a carboxyl group and an epoxy group. The present invention has been accomplished based on these novel findings.

The aqueous colored base coating composition (A) of the present invention is described below in detail.

The aqueous colored base coating composition (A) mainly comprises a hydroxyl- and carboxyl-containing acrylic resin (A-1), a melamine resin (A-2), an alicyclic epoxy-containing compound (A-3), a neutralizing agent (A-4) and a coloring pigment (A-5). Water is chiefly used as the solvent or disperse medium for the coating composition (A).

The component (A-1) is an acrylic resin having at least one hydroxyl group and at least one carboxyl group in one molecule.

Said acrylic resin is obtained by copolymerizing a hydroxyl-containing monomer, a carboxyl-containing monomer and an acrylic monomer as the essential components, together with other monomers when necessary.

The hydroxyl-containing monomer is a compound having at least one hydroxyl group and at least one polymerizable unsaturated bond in one molecule. Examples of said monomer include monoesterified products of acrylic or methacrylic acid and a $C_{2-10}$ glycol having two hydroxyl groups, such as hydroxyethyl acrylate, hydroxyethyl methacrylate, hydroxypropyl acrylate, hydroxypropyl methacrylate and the like.

The carboxyl-containing monomer is a compound having at least one carboxyl group and at least one polymerizable unsaturated bond in one molecule. Examples of said monomer are acrylic acid, methacrylic acid, maleic acid, fumaric acid, mesaconic acid, citraconic acid, itaconic acid, and anhydrides and half-esterified products of these acids.

The acrylic monomer is a monoesterified product of acrylic or methacrylic acid and a $C_{1-20}$ monohydric alcohol having one hydroxyl group. Useful acrylic monomers are, for example, methyl (meth)acrylate, ethyl (meth)acrylate, propyl (meth)acrylate, butyl (meth)acrylate, 2-ethylhexyl (meth)acrylate, lauryl (meth)acrylate and the like.

Said other monomers are monomers other than those mentioned above, and include, for example, styrene, vinyltoluene, acrylonitrile, methacrylonitrile, acrylamide, methacrylamide, vinyl acetate, glycidyl acrylate, glycidyl methacrylate and the like. Said other polymerizable monomers are used in an amount equivalent to or less than the amount of the acrylic monomer.

The component (A-1) is obtained by polymerizing the above monomers by a known method such as solution polymerization, emulsion polymerization or the like, and preferably has a number average molecular weight of about 3,000 to about 100,000, especially about 5,000 to about 50,000, a hydroxyl value of about 20 to about 150 mg KOH/g, especially about 30 to about 100 mg KOH/g and an acid value of about 5 to about 100 mg KOH/g, especially about 10 to about 70 mg KOH/g.

The acrylic resin (A-1) is used in the form of is an aqueous solution or dispersion wherein the carboxyl groups in the resin are neutralized with the component (A-4) described below.

The component (A-2) is a melamine resin which acts as the crosslinking agent for the acrylic resin (A-1). Usable as the component (A-2) are methylolated melamine, alkyletherified melamine obtained by etherifying some or all of the methylol groups with a $C_{1-10}$ monohydric alcohol, and the like. The component (A-2) preferably has a number average molecular weight of about 400 to about 3,000, especially about 500 to about 1,200, and may be either hydrophobic or hydrophilic.

The component (A-3) is an alicyclic epoxy-containing compound having at least one alicyclic epoxy group in one molecule. The alicyclic epoxy group in said compound is a functional group wherein the epoxy group consists of two adjacent carbon atoms which form an alicyclic hydrocarbon skeleton ring, and one oxygen atom. Said alicyclic hydrocarbon skeleton may be a 4- to 10-membered, preferably 5- or 6-membered saturated hydrocarbon ring, or a condensed hydrocarbon ring consisting of at least two hydrocarbon rings. Further, these hydrocarbon rings may be bonded to each other by a bridge such as an alkylene group or the like, to form bridged hydrocarbon rings.

Specific examples of the alicyclic epoxy compounds are shown below with structural formulas. Epoxidized tetrahydrobenzyl alcohol represented by the formula

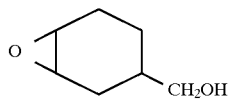
(1)

Lactone-modified epoxidized tetrahydrobenzyl alcohol represented by the formula

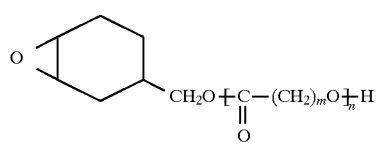
(2)

wherein m is an integer of 2 to 12, and n is a number of 1 to 20 (on average).

Cyclohexene oxide represented by the formula

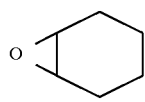
(3)

α-Pinene oxide represented by the formula

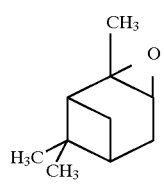
(4)

Vinyl-containing cyclohexene oxide represented by the formula

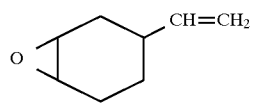
(5)

Compounds represented by the formulas

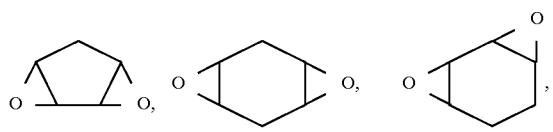

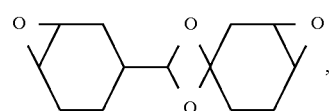

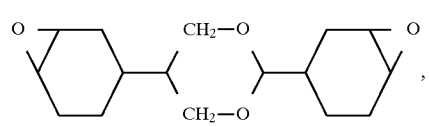

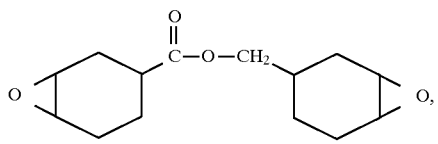

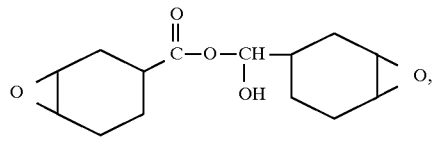

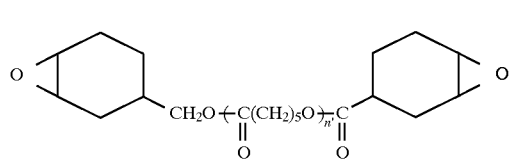

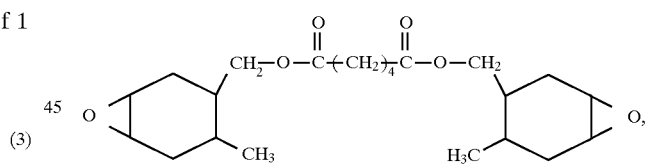

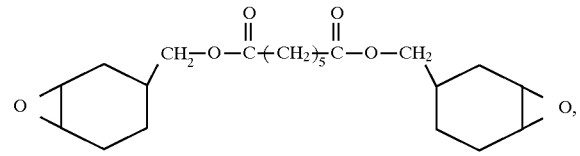

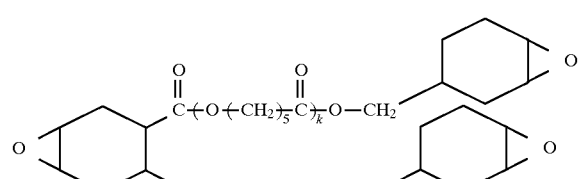

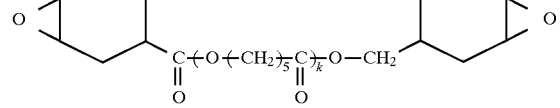

or

-continued

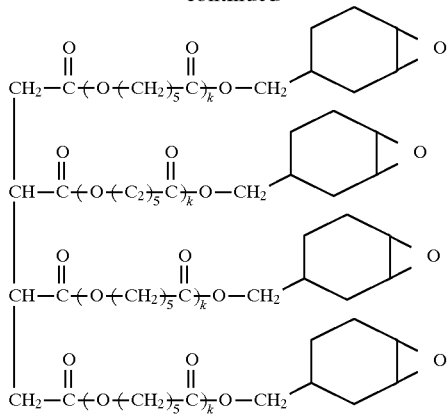

wherein n' is an integer of 1 to 8 and k is an integer of 0 to 15.

Compounds having a unit of the following formula

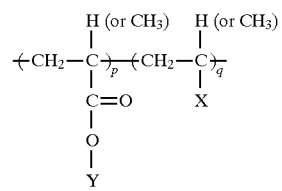

wherein Y is an alicyclic epoxy residue, X is

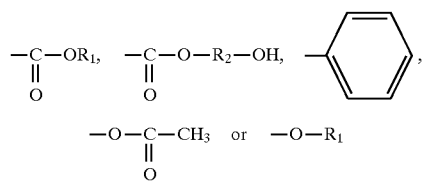

(wherein $R_1$ is a $C_{1-18}$ alkyl group or a cycloalkyl group and $R_2$ is a $C_{1-6}$ alkylene group), q is an integer of 0 to 100 and p is an integer of 1 to-100.

Y in the above unit formula is an organic group having an alicyclic epoxy group such as

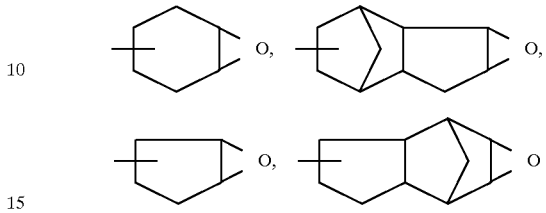

or the like.

The compounds having the unit of the above formula include those disclosed in Japanese Unexamined Patent Publication No. 255874/1990.

The compounds disclosed in the publication include, for example, radical polymerization products of polymerizable epoxy monomers such as 3,4-epoxycyclohexylmethyl acrylate, 3,4-epoxycyclohexylmethyl methacrylate, commercial available "METHB" and "AETHB" (tradenames, products of DAICEL CHEMICAL INDUSTRIES, LTD.) and the like. These monomers can be subjected to the radical polymerization singly or in combination with other radical polymerizable monomers.

Further, polymers obtained from compounds having an alicyclic epoxy group and a polymerizable unsaturated bond in one molecule can be used as the alicyclic epoxy-containing compound (A-3).

The compounds having an alicyclic epoxy group and a polymerizable unsaturated bond in one molecule include, for example, polymerizable epoxy monomers represented by the following formulas (6) to (17).

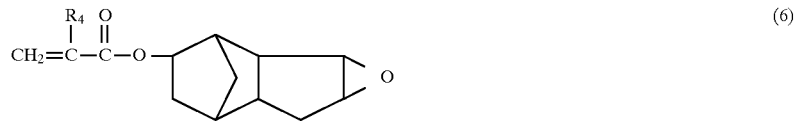 (6)

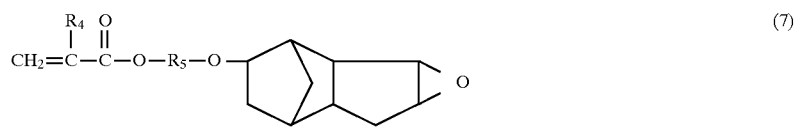 (7)

 (8)

 (9)

-continued

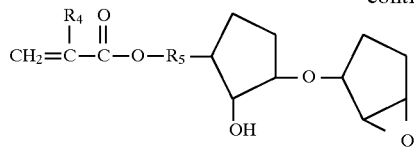 (10)

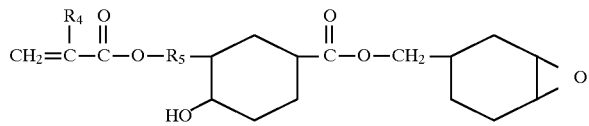 (11)

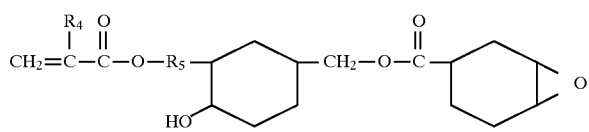 (12)

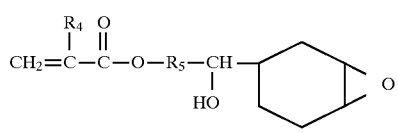 (13)

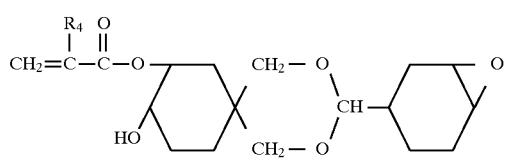 (14)

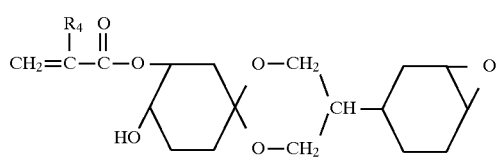 (15)

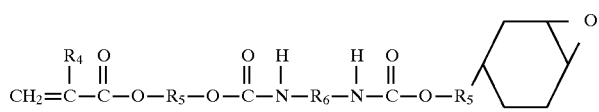 (16)

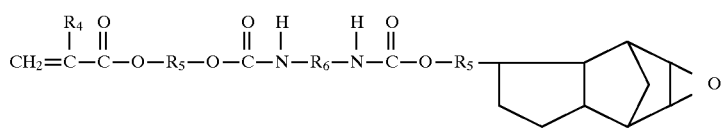 (17)

wherein $R_4$ is a hydrogen atom or a methyl group, $R_5$ is a $C_{1-6}$ bivalent aliphatic saturated hydrocarbon group and $R_6$ is a $C_{1-10}$ bivalent hydrocarbon group.

In the above polymerizable epoxy monomer, examples of the $C_{1-6}$ bivalent aliphatic saturated hydrocarbon group represented by $R_5$ are straight- or branched-chain alkylene groups such as methylene, ethylene, propylene, tetramethylene, ethylethylene, pentamethylene, hexamethylene and the like. Examples of the $C_{1-10}$ bivalent hydrocarbon group represented by $R_6$ are methylene, ethylene, propylene, tetramethylene, ethylethylene, pentamethylene, hexamethylene, polymethylene, phenylene, the groups

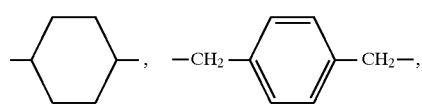

and the like.

Specific examples of the polymerizable epoxy monomers represented by the formulas (6) to (17) are 3,4-epoxycyclohexylmethyl acrylate, 3,4-epoxycyclohexylmethyl methacrylate and the like. These monomers are commercially available under the tradenames "METHB" and "AETHB" (DAICEL CHEMICAL INDUSTRIES, LTD.) and the like. In addition, 4-vinylcyclohexene oxide can be used as the polymerizable epoxy monomer.

The polymer as the component (A-3) can be produced by polymerizing at least one of the above polymerizable epoxy monomers. Other polymerizable unsaturated monomer can be copolymerized in combination with the polymerizable epoxy monomers.

Said other polymerizable unsaturated monomers can be selected from a wide range according to the desired performance of the resulting polymer, and typical examples of such monomers are as follows.

(a) Esters of acrylic or methacrylic acid For example, $C_{1-18}$ alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like; $C_{2-18}$ alkoxyalkyl esters of acrylic or methacrylic acid, such as methoxybutyl acrylate, methoxybutyl methacrylate, methoxyethyl acrylate, methoxyethyl methacrylate, ethoxybutyl acrylate, ethoxybutyl methacrylate and the like; $C_{2-8}$ alkenyl esters of acrylic or methacrylic acid, such as allyl acrylate, allyl methacrylate and the like; and $C_{2-8}$ hydroxyalkyl esters of acrylic or methacrylic acid, such as hydroxyethyl acrylate, hydroxyethyl methacrylate, hydroxypropyl acrylate, hydroxypropyl methacrylate and the like.

(b) Vinyl aromatic compounds

For example, styrene, α-methylstyrene, vinyltoluene and p-chlorostyrene.

(c) Polyolefin compounds

For example, butadiene, isoprene and chloroprene.

(d) Other compounds

For example, acrylonitrile, methacrylonitrile, methylisopropenyl ketone, vinyl acetate, "Veova monomer" (tradename, product of SHELL CHEMICALS CO., LTD.), vinyl propionate, vinyl pivalate, and vinyl compounds having a polycaprolacton chain, such as "FM-3X monomer" (tradename, product of DAICEL CHEMICAL INDUSTRIES, LTD.).

The ratio of the polymerizable epoxy monomer to other polymerizable unsaturated monomers can be suitably selected according to the purpose, from the range in which the copolymerization of these monomers gives the component (A-3) having at least one, preferably at least two, more preferably at least four alicyclic epoxy groups per molecule. However, to obtain functional groups which impart satisfactory curability, it is suitable that the component (A-3) contain the polymerizable epoxy monomer in a proportion of 5 to 100% by weight, preferably 20 to 100% by weight, based on the solid content of the component (A-3).

The polymer for use as the component (A-3) can be produced by the same method under the same conditions as for the conventional polymerization reactions to obtain an acrylic resin, vinyl resin and the like, which is caused by a polymerizable unsaturated bond. The polymerization reaction can be carried out, for example, by a method comprising dissolving or dispersing the monomer components in an organic solvent and heating the solution or dispersion in the presence of a radical polymerization initiator with stirring at about 60° to about 180° C. The reaction time is usually about 1 to about 10 hours. Usable organic solvents include alcohol type solvents, ether type solvents, ester type solvents, hydrocarbon type solvents and the like. From the viewpoint of solubility, the hydrocarbon type solvents, when employed, are preferably used in combination with other solvents. Any of conventionally used radical polymerization initiators can be employed. Specific examples of usable initiators are peroxides such as benzoyl peroxide, t-butylperoxy-2-ethylhexanoate, etc.; azo compounds such as azoisobutyronitrile, azobisdimethylvaleronitrile, etc.; and the like.

The alicyclic epoxy compound for use as the component (A-3) is preferably excellent in miscibility with the components (A-1) and (A-2) and stable in water. From such viewpoints, it is suitable that the component (A-3) have a number average molecular weight of about 90 to about 50,000, preferably about 200 to about 5,000 and have 2 to 200 alicyclic epoxy groups in one molecule. The number average molecular weight of more than about 50,000 is not preferable since the storage stability of the resulting aqueous base coating composition is likely to reduce. On the other hand, if the number of alicyclic epoxy groups in one molecule is less than 2, the improvement of chipping resistance can not be achieved, whereas if the number of said groups is more than about 200, the smoothness of the aqueous base coat is likely to reduce. Thus, the number of the alicyclic epoxy groups outside said range is not desirable.

In the practice of the present invention, it is not preferable to replace the alicyclic epoxy compound with a compound having epoxy groups other than the alicyclic epoxy group, since the resulting aqueous coating composition has unsatisfactory storage stability. Further, the use of compounds having other epoxy groups results in a cured coating film which is unsatisfactory in chipping resistance, water resistance and other film properties, hence is not preferable.

The component (A-4) is a neutralizing agent which neutralizes the carboxyl groups in the component (A-1) to impart solubility or dispersibility in water. Examples of the neutralizing agents are ammonia, trimethylamine, triethylamine, dimethylethanolamine, triethanolamine, tetraethylammonium hydroxide, diethylaminoethanol and the like. Among them, dimethylethanolamine is preferable.

The component (A-5) is a coloring pigment for use as a coloring matter to give solid or metallic color to the coating film of the aqueous colored base coating composition (A), and includes conventional coloring and metallic pigments. Specific examples of the coloring pigments include known coloring pigments for coating compositions such as inorganic coloring pigments, e.g., titanium white, carbon black, chrome vermillion, molybdate red, chrome yellow, yellow iron oxide, chrome green, ultramarine, cobalt violet, etc.; organic coloring pigments, e.g., phthalocyanine blue, phthalocyanine red, phthalocyanine green, monoazo pigments, chinacridone violet, etc.; and flaky metallic pigments, e.g., aluminum flake, copper flake, mica-like iron oxide, mica, mica coated with metal oxide, etc.

The aqueous colored base coating composition (A) mainly comprises the above components (A-1), (A-2), (A-3), (A-4) and (A-5) in proportions suitably selected according to the purpose. Generally, however, the aqueous colored base coating composition (A) preferably contains 20 to 60 parts by weight, especially 25 to 50 parts by weight of component (A-2) and 0.5 to 15 parts by weight, especially 3 to 10 parts by weight of the component (A-3) based on 100 parts by weight of the component (A-1), and 0.2 to 1.5 equivalents, especially 0.5 to 1.2 equivalents of the component (A-4) based on the carboxyl group in the component (A-1). The component (A-5) may be added in a suitable amount for giving the desired solid or metallic color to the coating film of the composition (A).

The coating composition (A) may further comprises, when necessary, organic resins such as polyester resin, urethane resin, polyamide resin and the like, extender pigments, anti-settling agents, antifoaming agents and the like.

Usable media for the coating composition (A) are water and mixtures of water and a suitable amount of organic solvent. The organic solvent is not specifically limited, but preferably usable are, for example, isobutyl alcohol, butyl cellosolve, butyl carbitol, isopropanol and the like.

The aqueous colored base coating composition (A) is prepared by dispersing or dissolving the above components in the above medium by mixing, and preferably has a solid content of about 10 to about 50% by weight (when applied).

The clear coating composition (B) for use in the method for forming a topcoat according to the present invention is applied to the coating surface of the aqueous colored base coating composition (A) for forming a clear coat. The coating composition (B) is a thermosetting organic solvent type clear coating composition to be cured by the crosslinking reaction between a carboxyl group and an epoxy group.

Specific examples of the coating composition (B) include a clear coating composition (B-1) mainly comprising a mixture of a carboxyl-containing resin (B-1a) and an epoxy-containing resin (B-1b), a clear coating composition (B-2) mainly comprising a resin (B-2a) having a carboxyl group and an epoxy group in one molecule, and the like.

Examples of the carboxyl-containing resin (B-1a) are carboxyl-containing vinyl resin and carboxyl-containing polyester resin and the like. These resins is can be used singly or in combination.

The carboxyl-containing vinyl resin in the component (B-1a) is prepared by polymerizing a carboxyl-containing polymerizable monomer singly or in combination with other polymerizable monomers.

The carboxyl-containing polymerizable monomer is a compound having a carboxyl group and a polymerizable double bond in one molecule, the carboxyl group including acid anhydrides. Specific examples of said monomer are acrylic acid, methacrylic acid, crotonic acid, maleic acid, maleic anhydride, fumaric acid, mesaconic acid, itaconic acid, itaconic anhydride, aconitic acid and the like. These compounds can be used singly or as a mixture of two or more. Among them, the dibasic acids (including acid anhydrides) may be half-esterified for use as the carboxyl-containing polymerizable monomer. The half esterification is carried out by reacting the dibasic acid with an aliphatic monohydric alcohol such as methanol, ethanol, propanol, butanol, methyl cellosolve or the like in the presence of tertiary amine (catalyst). The half-esterification reaction may be carried out before or after the polymerization.

The other polymerizable monomer is a compound which has at least one polymerizable double bond in one molecule and may have functional groups other than carboxyl and epoxy groups. Examples of said monomer are hydroxyl-containing monomers such as hydroxyethyl (meth)acrylate, hydroxypropyl (meth)acrylate, hydroxybutyl (meth) acrylate, monoesters of polyethylene glycol and (meth) acrylic acid, etc.; monoesters of a $C_{1-24}$ aliphatic or alicyclic monohydric alcohol and (meth)acrylic acid; monoesters of a $C_{2-18}$ alkoxyalkyl monohydric alcohol and (meth)acrylic acid; vinyl ethers such as ethyl vinyl ether, pentyl vinyl ether, cyclohexyl vinyl ether, benzyl vinyl ether, allyl glycidyl ether, etc.; styrenes such as styrene, α-methyl styrene, etc.; nitrogen-containing monomers such as (meth) acrylamide, N,N-dimethylaminoethyl (meth)acrylate, N,N-diethylaminoethyl (meth)acrylate, N-methyl (meth) acrylamide, vinylpyridine, acrylonitrile, etc.; vinyl acetate and vinyl chloride; and the like. These monomers can be used singly or as a mixture of two or more.

The carboxyl-containing vinyl resin can be prepared by polymerizing the above carboxyl-containing polymerizable monomer singly or in combination with other monomers, and is substantially free from epoxy groups. The polymerization is carried out by a known process, preferably by an organic solution type radical polymerization process. The vinyl resin preferably has an acid value of about 30 to about 250 mg KOH/g, especially about 50 to about 150 mg KOH/g and a number average molecular weight of about 1,000 to about 100,000, especially about 3,000 to about 50,000. The vinyl resin may further contain hydroxyl groups. In that case, a suitable hydroxyl value is about 150 mg KOH/g or less, especially about 10 to about 100 mg KOH/g.

The carboxyl-containing polyester resin in the component (B-1a) is obtained, for example, by reacting a polyhydric alcohol such as ethylene glycol, butylene glycol, hexane diol, trimethylol propane, pentaerythritol or the like with a polyvalent carboxylic acid such as succinic anhydride, adipic acid, terephthalic acid, isophthalic acid, phthalic anhydride, hexahydrophthalic anhydride or the like in such a ratio that the carboxyl groups are present in excess.

Said carboxyl-containing polyester resin can be obtained also by carrying out the above reaction in such a ratio that the hydroxyl groups are present in excess to synthesize a polyester resin having a hydroxyl group at the end, and then carrying out an addition reaction of the hydroxyl groups with a carboxylic anhydride such as succinic anhydride, phthalic anhydride, hexahydrophthalic anhydride or the like.

The polyester resin preferably has an acid value of about 10 to about 100 mg KOH/g, especially about 15 to about 80 mg KOH/g and a number average molecular weight of about 1,000 to about 80,000, especially about 2,000 to about 30,000. Said resin may further contain hydroxyl groups. In that case, a suitable hydroxyl value is about 150 mg KOH/g or less, especially about 10 to about 100 mg KOH/g.

Examples of the epoxy-containing resin (B-1b) includes epoxy-containing vinyl resins prepared by polymerizing an epoxy-containing polymerizable monomer singly or in combination with other polymerizable monomers.

Said epoxy-containing polymerizable monomer is a compound having at least one epoxy group and at least one polymerizable double bond in one molecule. Specific examples of said monomer are glycidyl acrylate, glycidyl methacrylate, allyl glycidyl ether and the like. These monomers can be used singly or as a mixture of two or more.

As the other polymerizable monomer, the other polymerizable monomers for use in the component (B-1a) can be used singly or as a mixture of two or more.

Said epoxy-containing vinyl resin is obtained by polymerizing the above epoxy-containing polymerizable monomer singly or in combination with the other monomers, and substantially free from carboxyl groups. The polymerization is carried out by a known process, preferably by an organic solution type radical polymerization process. Said vinyl resin preferably has an epoxy content of about 0.8 to about 3.2 mmol/g, especially about 1.2 to about 2.8 mmol/g and a number average molecular weight of about 2,000 to about 15,000, especially about 3,000 to about 11,000. Said vinyl resin may further contain hydroxyl groups. In that case, a suitable hydroxyl value is about 150 mg KOH/g or less, especially about 20 to about 60 mg KOH/g.

The clear coating composition (B-1) mainly comprises a mixture of the carboxyl-containing resin (B-1a) and the epoxy-containing resin (B-1b). The proportions of the resins (B-1a) and (B-1b) can be suitably selected according to the purpose, but generally, suitable proportions are about 10 to about 90% by weight, especially 30 to 70% by weight of the former and about 90 to about 10% by weight, especially about 70 to about 30% by weight of the latter.

The clear coating composition (B-2) mainly comprises a resin (B-2a) having a carboxyl group and an epoxy group in one molecule.

Preferred examples of the resin (B-2a) are vinyl resins prepared by polymerizing the above carboxyl-containing polymerizable monomer and epoxy-containing polymerizable monomer, optionally together with the other monomers. The monomers already mentioned can be used as each of the monomer components singly or as a mixture of two or more. The polymerization is carried out by a known process, preferably by an organic solution type radical polymerization process. The resin (B-2a) preferably has an acid value of about 30 to about 250 mg KOH/g, especially about 50 to about 150 mg KOH/g, an epoxy content of about 0.8 to about 3.2 mmol/g, especially about 1.2 to about 2.8 mmol/g, and a number average molecular weight of about 1,000 to about 100,000, especially about 2,000 to about 50,000. Said resin may further contain hydroxyl groups. In that case, a suitable hydroxyl value is about 150 mg KOH/g or less, especially about 10 to about 100 mg KOH/g.

The clear coating compositions (B-1) and (B-2) may further comprise a vinyl polymer (B—Si) having a hydrolyzable silyl group or having a hydrolyzable silyl group and a hydroxyl group in one molecule. The use of the vinyl polymer (B—Si) results in a clear coat which is more improved in acid resistance, scratch resistance and the like.

The vinyl polymer (B—Si) essentially comprises a hydrolyzable silyl-containing polymerizable monomer, and is obtained by polymerizing said monomer and, when necessary, a hydroxyl-containing polymerizable monomer and other polymerizable monomers. The polymerization can be carried out by a known process, preferably by an organic solution type radical polymerization process.

Said hydrolyzable silyl-containing polymerizable monomer is a compound having at least one hydrolyzable silyl group and at least one polymerizable double bond in one molecule. Specific examples of said monomer are vinyltrimethoxysilane, vinyltriethoxysilane, vinyltris(2-methoxyethoxy)silane, γ-(meth)acryloyloxy-propyltrimethoxysilane, γ-(meth)acryloyloxypropyl-triethoxysilane and the like. These monomers can be used singly or as a mixture of two or more.

The hydroxyl-containing polymerizable monomer is a compound having at least one hydroxyl group and at least one polymerizable double bond in one molecule. Specific examples of said monomer are hydroxyethyl (meth)acrylate, hydroxypropyl (meth)acrylate, hydroxybutyl (meth) acrylate, monoesters of polyethylene glycol and (meth) acrylic acid, adducts of α, β-unsaturated carboxylic acid with a monoepoxy compound such as Cardura E10 (tradename, product of SHELL PETROCHEMICAL CO., LTD.), α-olefin epoxide, etc., adducts of glycidyl methacrylate with a monobasic acid such as acetic acid, propionic acid, p-tert-butylbenzoic acid, fatty acid, etc., and the like.

As the other polymerizable monomer, at least one of those mentioned above can be used.

The proportions of the monomers in the vinyl polymer (B—Si) are not limited specifically, but preferred proportions are 10 to 60% by weight, especially 20 to 50% by weight of the hydrolyzable silyl-containing polymerizable monomer, 0 to 50% by weight, especially 10 to 40% by weight of the hydroxyl-containing polymerizable monomer and 40 to 90% by weight, especially 50 to 80% by weight of the other polymerizable monomer, based on the total weight of these monomers. The vinyl polymer (B—Si) preferably has a number average molecular weight of 2,000 to 15,000.

The vinyl polymer (B—Si) is used preferably in an amount of 25 to 65 parts by weight based on the total solid content of the components (B-1a) and (B-1b) in the composition (B-1), or based on the solid content of the component (B-2a) in the composition (B-2).

The clear coating composition (B) can be prepared by dispersing or dissolving the above components in an organic solvent for coating compositions by mixing, and preferably has a solid content of 30 to 80% by weight (when applied). Usable solvents include various organic solvents for coating compositions such as aromatic, alicyclic or aliphatic hydrocarbon type solvents, alcohol type solvents, ester type solvents, ketone type solvents, ether type solvents and the like. The clear coating composition (B) may further comprise, when necessary, additives for coating compositions such as fine particulate nonaqueous polymers, melamine resin, blocked isocyanate, curing catalysts, UV absorbers, antioxidants, surface modifiers, antifoaming agents, etc.

The method of forming a topcoat of the invention is preferably carried out according to the 2-coat 2-bake system comprising applying an aqueous colored base coating composition (A) to a substrate, curing the base coat by heating, applying the organic solvent type clear coating composition (B) to the base coat and curing the clear coat by heating, or according to the 2-coat 1-bake system comprising applying the base coating composition (A) to a substrate, applying the clear coating composition (B) to the uncured base coat and curing the two coats concurrently by heating.

Suitable substrates for the method of the present invention include automotive exterior panels primed by applying an undercoating composition such as a cationic electrodeposition coating composition or the like and, when necessary, an intercoating composition, and curing the coat(s) by heating.

Stated more specifically, the method of the invention is carried out as follows. The aqueous colored base coating composition (A) is applied to the substrate by electrostatic coating, spray coating or like coating process to a thickness of 10 to 50 μm (when cured). After curing the base coat by heating or without curing said coat, the clear coating composition (B) is applied to the coating surface of the base coating composition (A) by electrostatic coating, spray coating or like coating process to a thickness of 20 to 80 μm (when cured). Then, the clear coat, singly or together with the base coat, is cured by heating. Usually, the coats are preferably cured at about 100° to about 160° C. for about 10 to about 60 minutes.

The present invention is described below in more detail with reference to Preparation Examples, Examples and Comparative Examples, wherein the parts and percentages are all by weight.

PREPARATION EXAMPLE 1

Preparation of hydroxyl- and carboxyl-containing acrylic resin (A-1)

A reactor was charged with 50 parts of butyl cellosolve. Added thereto were 10 parts of styrene, 25 parts of methyl methacrylate, 20 parts of n-butyl methacrylate, 25 parts of n-butyl acrylate, 15 parts of hydroxyethyl methacrylate and 5 parts of acrylic acid as monomer components and 6 parts of azoisobutyronitrile as a radical polymerization initiator. The mixture was polymerized at 120° C. for 3 hours, giving a solution of the hydroxyl- and carboxyl-containing acrylic resin (A-1) having a solid content of 65%. The resin had a hydroxyl value of 65 mg KOH/g, an acid value of 40 mg KOH/g and a number average molecular weight of 12,000.

The resin solution was treated with dimethyl ethanolamine [component (A-4)] to subject the carboxyl groups in said resin to equivalent neutralization. Then, 100 parts of water was added to obtain a resin (A-1)-I.

PREPARATION EXAMPLE 2

Preparation of aqueous colored base coating composition (A)

The resin (A-1)-I obtained in Preparation Example 1 was used as the components (A-1) and (A-4).

"Cymel 370" (tradename, product of CYTEC CO., LTD., a methylol- and methyl ether-containing melamine resin having a number average molecular weight of 600) [resin (A-2)-I] was used as the component (A-2).

Used as the component (A-3) were the lactone-modified epoxidized tetrabenzyl alcohol of the above formula (2) wherein m is 5 and n is 1.5 on average [compound (A-3)-I], "Celoxide 2021" (tradename, product of DAICEL CHEMICAL INDUSTRIES, LTD., having the structure

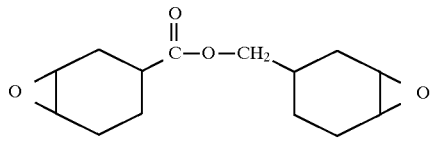

) [compound (A-3)-II], "ERC-4299" (tradename, product of UNION CARBIDE CORP., having the structure

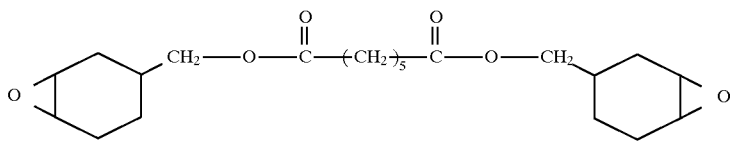

) [compound (A-3)-III], "EPOLIDE GT-300" (tradename, product of DAICEL CHEMICAL INDUSTRIES, LTD., having the structure

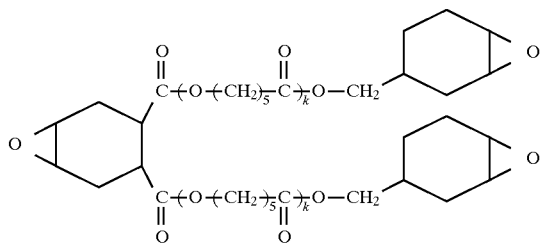

) [compound (A-3)-IV] or "EHPE3150" (tradename, product of DAICEL CHEMICAL INDUSTRIES, LTD., an epoxidized polyvinylcyclohexene oxide having a structure wherein one carbon atom of the epoxy group is bonded to one carbon atom forming the cyclohexene ring, having a number average molecular weight of about 1,500, for comparative use) [compound (A-3)-V].

As the metallic pigment, "Alumipaste N-519" (tradename, aluminum flake pigment produced by TOYO ALUMINUM K.K.) was used.

These components were mixed with water in the proportions shown in Table 1 to prepare aqueous colored (metallic) base coating compositions (A)-(1) to (A)-(4) of the present invention and comparative aqueous colored (metallic) base coating compositions (A)-(5) and (A)-(6). The coating compositions had a solid content of 22% by weight and a viscosity of 40 seconds (Ford cup #4/20° C.).

The coating compositions thus obtained were tested for storage stability by the following test method.

Storage Stability Test

Each of the coating compositions was diluted with deionized water to a viscosity of 30 seconds (Ford cup #4/20° C.). A 300 g portion of the diluted composition was placed into a beaker, which was then loosely covered with aluminum foil. After storage at 40° C. for 2 weeks, the viscosity (Ford cup #4/20° C.) of the diluted composition was measured to evaluate the storage stability. The evaluation was made according to the following criteria.

A: Good storage stability (viscosity of 50 seconds or less)
B: Slightly lowered storage stability (viscosity of 70 seconds or less)
C: Poor storage stability (viscosity of more than 70 seconds)

The results of the storage stability test are shown in Table 1.

TABLE 1

| Component | Aqueous colored base coating composition (A) | | | | | |
|---|---|---|---|---|---|---|
| | (A)-(1) | (A)-(2) | (A)-(3) | (A)-(4) | (A)-(5) | (A)-(G) |
| (A-1)-I | 100 | 100 | 100 | 100 | 100 | 100 |
| (A-2)-I | 30 | 35 | 40 | 35 | 35 | 35 |
| (A-3)-I | 5 | — | — | — | — | — |
| (A-3)-II | — | 7 | — | — | — | — |
| (A-3)-III | — | — | 9 | — | — | — |

TABLE 1-continued

| Component | Aqueous colored base coating composition (A) | | | | | |
|---|---|---|---|---|---|---|
| | (A)-(1) | (A)-(2) | (A)-(3) | (A)-(4) | (A)-(5) | (A)-(G) |
| (A-3)-IV | — | — | — | 5 | — | — |
| (A-3)-V | — | — | — | — | 7 | — |
| Metallic pigment | 20 | 20 | 20 | 20 | 20 | 20 |
| Storage stability | A | A | A | A | C | A |

The numeric values in the table are amounts of the components in terms of parts by weight of the solid content.

PREPARATION EXAMPLE 3

Preparation of carboxyl-containing resin (B-1a)

A 5-liter glass flask equipped with a stirrer, a thermometer and a condenser was charged with 553 parts of xylene and 276 parts of 3-methoxybutyl acetate. The mixture was heated to 125° C. by an electrothermic mantle. At the same temperature, a mixture having the following monomer composition was added dropwise at a uniform rate over a period of 4 hours. Tert-butylperoxy-2-ethyl hexanoate is a polymerization initiator.

| | |
|---|---|
| Methanol half ester of maleic anhydride | 288 parts (20%) |
| 4-Hydroxy-n-butyl acrylate | 288 parts (20%) |
| n-Butyl acrylate | 576 parts (40%) |
| Styrene | 288 parts (20%) |
| Tert-butylperoxy-2-ethyl hexanoate | 72 parts |

The mixture was aged for 30 minutes. Added dropwise was a mixture of 277 parts of 3-methoxybutyl acetate and 14.4 parts of tert-butylperoxy-2-ethylhexanoate over a period of 2 hours. The mixture was aged for 2 hours, giving a solution of a carboxyl-containing vinyl resin (B-1a)-I with a final conversion of 98%.

The obtained polymer solution had a polymer solid content of 55% and a Gardner viscosity (25° C.) of M. The polymer had a number average molecular weight of 3,500, an acid value of 86 mg KOH/g and a hydroxyl value of 78 mg KOH/g.

PREPARATION EXAMPLE 4
Preparation of carboxyl-containing resin (B-1a)

A solution of a carboxyl-containing vinyl resin (B-1a)-II was obtained with a final conversion of 95% in the same manner as in Preparation Example 3 with the exception of changing the monomer composition as follows.

| | |
|---|---|
| Methanol half ester of maleic anhydride | 288 parts (20%) |
| 2-Hydroxyethyl acrylate | 230 parts (16%) |
| n-Butyl acrylate | 634 parts (44%) |
| Styrene | 288 parts (20%) |
| Tert-butylperoxy-2-ethylhexanoate | 72 parts |

The obtained polymer solution had a polymer solid content of 55% and a Gardner viscosity (25° C.) of O. The polymer had a number average molecular weight of 3,500, an acid value of 86 mg KOH/g and a hydroxyl value of 78 mg KOH/g.

PREPARATION EXAMPLE 5
Preparation of epoxy-containing resin (B-1b)

A 5-liter glass flask equipped with a stirrer, a thermometer and a condenser was charged with 580 parts of xylene and 250 parts of n-butanol. The mixture was heated to 125° C. by an electrothermic mantle. At the same temperature, a mixture having the following monomer composition was added dropwise at a uniform rate over a period of 4 hours. Azobisisobutylonitrile is a polymerization initiator.

| | |
|---|---|
| Glycidyl methacrylate | 432 parts (30%) |
| 4-Hydroxy-n-butyl acrylate | 288 parts (20%) |
| n-Butyl acrylate | 432 parts (30%) |
| Styrene | 288 parts (20%) |
| Azobisisobutyronitrile | 72 parts |

The mixture was aged for 30 minutes. Added dropwise was a mixture of 90 parts of xylene, 40 parts of n-butanol and 14.4 parts of azobisisobutyronitrile over a period of 2 hours. The mixture was aged for 2 hours, giving a solution of an epoxy-containing vinyl resin (B-1b)-I with a final conversion of 100%.

The obtained polymer solution had a polymer solid content of 60% and a Gardner viscosity (25° C.) of S. The polymer had a number average molecular weight of 3,000, an epoxy content of 2.12 mmol/g and a hydroxyl value of 78 mg KOH/g.

PREPARATION EXAMPLE 6
Preparation of hydrolyzable silyl-containing vinyl polymer (B—Si)

A solution of a hydrolyzable silyl-containing vinyl polymer (B—Si)-I was prepared with a final conversion of 99% in the same manner as in Preparation Example 5 with the exception of changing the monomer composition as follows.

| | |
|---|---|
| γ-Methacryloxypropyltriethoxysilane | 288 parts (20%) |
| 2-Hydroxy-n-propyl acrylate | 288 parts (20%) |
| n-Butyl methacrylate | 576 parts (40%) |
| Styrene | 288 parts (20%) |

The obtained polymer solution had a polymer solid content of 60% and a Gardner viscosity (25° C.) of U. The polymer had a number average molecular weight of 4,000 and a hydroxyl value of 86 mg KOH/g.

PREPARATION EXAMPLE 7
Preparation of organic solvent type clear coating composition (B)

Solutions having the compositions shown in Table 2 (on solid basis) were prepared. To each of the solutions were added 2 parts of a mixture consisting of tetrabutylammonium bromide and monobutylphosphoric acid in equivalent amount (curing catalyst), 1 part of "Tinuvin 900" (tradename, product of CIBA-GEIGY LTD., ultraviolet absorber) and 0.1 part of "BYK-300" (tradename, product of BYK-CHEMIE CO., surface modifier). The mixture was diluted with "SWASOL 1000" (tradename, product of COSMO OIL CO., LTD., hydrocarbon type solvent) to adjust the viscosity to 25 seconds (Ford cup #4/20° C.), giving organic solvent type clear coating compositions (B)-(1) to (B)-(4). The solid contents of the obtained compositions (when applied) were measured and shown in Table 2.

TABLE 2

| Component | Organic solvent type clear coating composition (B) | | | |
|---|---|---|---|---|
| | (B)-(1) | (B)-(2) | (B)-(3) | (B)-(4) |
| (B-1a)-I | 50 | — | 50 | — |
| (B-1a)-II | — | 60 | — | 60 |
| (B-1b)-I | 50 | 40 | 50 | 40 |
| (B-Si)-I | — | — | 35 | 45 |
| Solid content | 50% | 45% | 55% | 55% |

EXAMPLES 1 to 4 AND COMPARATIVE EXAMPLES 1 and 2 FORMATION OF TOPCOAT

A topcoat was formed by the following procedure according to the 2-coat 1-bake system using the aqueous colored base coating composition (A) obtained in Preparation Example 2 and the organic solvent type clear coating composition (B) obtained in Preparation Example 7.

A dull steel panel of 0.8 mm thickness treated by chemical conversion with zinc phosphate was coated with an epoxy type cationic electrodeposition coating composition (tradename "ELECRON #9800", product of KANSAI PAINT CO., LTD.) to give a coating film of 20 μm thickness (when dried). The coated panel was baked at 170° C. for 20 minutes, polished with sand paper (# 400), and degreased by wiping with petroleum benzine. The coated panel was further coated by air spray coating with an automotive intercoating surfacer "LUGA BAKE AM" (tradename, product of KANSAI PAINT CO., LTD., polyester resin-melamine resin type) to give a coating film of about 25 μm thickness (when dried). The coated panel was baked at 140° C. for 30 minutes, subjected to wet rubbing with sand paper (# 400), dehydrated for drying, and degreased by wiping with petroleum benzine, giving a test substrate.

The aqueous colored (metallic) base coating composition (A) was applied to the test substrate to a thickness of 20 μm (when cured). The coated substrate was allowed to stand at room temperature for 5 minutes, and the organic solvent type clear coating composition (B) was applied to the coating surface to a thickness of 40 μm (when cured). The coated panel was heated to 140° C. for 30 minutes, whereby the two coats were cured to form a topcoat.

The multi-layer topcoat thus formed was tested for film performance by the following test methods.

Chipping resistance test

The test was carried out using "Q-G-R GRAVELLO METER" (tradename, product of Q PANEL CORP.). About 500 ml of crushed stones each having a diameter of about 15 to about 20 mm were blown against the test panel at an angle of 45° at an air pressure of about 4 kg/cm² and at a temperature of about 20° C. to give an impact to the coating film. The condition of the coating surface was visually inspected and evaluated according to the following criteria.

A: Good chipping resistance (the topcoat was partially and very slightly marred by the impact, but the electrodeposition coat was not peeled off at all).

B: Slightly lower chipping resistance (the topcoat and intercoat were marred by the impact, and the electrodeposition coat was slightly peeled off).

C: Poor chipping resistance (the topcoat and intercoat were marred in numerous parts by the impact, and the electrodeposition coat was markedly peeled off).

Intercoat adhesion test

In the center of the test panel, 11 parallel cuts were made by a cutting knife widthwise and lengthwise to reach the substrate (dull steel panel) with spacing of 1 mm to obtain 100 squares in 1 cm². Cellophane adhesive tape was applied to the cut surface and rapidly peeled off. The cut surface was evaluated according to the following criteria.

A: No peeling.

B: A slight degree of peeling between the metallic base coat and the clear coat.

C: A marked degree of peeling between the metallic base coat and the clear coat.

Water resistance test

The test panel was immersed in water maintained at 40° C. for 240 hours and washed with water, followed by visual inspection of the coating surface. The evaluation was made according to the following criteria.

A: No change.

B: Slight tarnishing on the coating surface.

C: Blushing on the coating surface.

Acid resistance test

A half area of the test panel was immersed in a 40% solution of sulfuric acid and allowed to stand at 50° C. for 5 hours, followed by washing with water. The coating surface was visually inspected and evaluated according to the following criteria.

A: No change.

B: No change on the coating surface but a slight difference in film thickness between the immersed portion and unimmersed portion.

C: Blushing on the coating surface.

Weatherability test

The test panel was exposed to a sunshine weatherometer for 1,000 hours and the condition of the coating film was visually inspected. The evaluation was made according to the following criteria.

A: No change.

B: A slight degree of crazing.

C: Crazing.

Scratch resistance test

An automobile with the test panel attached to the roof was washed 15 times by a car washer, and the coating surface of the test panel was visually inspected. The car washer used was "PO 20FWRC", a product of Yasui Sangyo Co., Ltd. The results were evaluated according to the following criteria.

A: Substantially no scratch mark was found.

B: Slight scratch marks were found but to a negligible extent.

C: Marked scratch marks were found.

Gloss test

According to the specular gloss measurement of JIS K-5400 7. 6 (1990), the reflectance when the incident angle and the light receiving angle were 20° was measured and expressed by percentage when taking the gloss of reference surface of specular gloss as 100.

The test results are shown in Table 3.

TABLE 3

|  | Example | | | | Comp. Ex. | |
| --- | --- | --- | --- | --- | --- | --- |
|  | 1 | 2 | 3 | 4 | 1 | 2 |
| Base coating composition (A) | (A)-(1) | (A)-(2) | (A)-(3) | (A)-(4) | (A)-(5) | (A)-(6) |
| Clear coating composition (B) | (B)-(1) | (B)-(2) | (B)-(3) | (B)-(4) | (B)-(1) | (B)-(1) |
| Film performance |  |  |  |  |  |  |
| Chipping resistance | A | A | A | A | B | C |
| Intercoat adhesion | A | A | A | A | B | C |
| Water resistance | A | A | A | A | B | C |
| Acid resistance | A | A | A | A | B | C |
| Weatherability | A | A | A | A | B | C |
| Scratch resistance | B | B | A | A | B | B |
| Gloss | 91 | 93 | 92 | 94 | 71 | 85 |

According to the present invention, the following remarkable results can be accomplished.

(1) The aqueous colored base coating composition (A) of the invention can form a coating film excellent in chipping resistance, water resistance and the like.

(2) By the method of forming a topcoat according to the present invention, a multi-layer topcoat comprising a colored base coat and a clear coat which is good in acid resistance, chipping resistance, intercoat adhesion, water resistance, weatherability and the like can be formed on substrates such as automotive exterior panels, etc.

(3) In the aqueous colored base coating composition (A) of the invention, the epoxy groups in the alicyclic epoxy-containing compound (A-3) causes a crosslinking reaction with the carboxyl groups which has been introduced into the hydroxyl- and carboxyl-containing acrylic resin (A-1) for making the resin (A-1) aqueous. Due to this crosslinking reaction, the film strength such as chipping resistance is especially improved. In addition, the water resistance, acid resistance and the like of the coating film are also improved since the coating film has less free carboxyl groups acting as hydrophilic group. Further, since the component (A-3) is stable in water, the composition (A) is advantageously free from thickening and precipitation during storage.

We claim:

1. A method for forming a topcoat which comprises applying to a substrate an aqueous colored base coating composition (A) comprising a hydroxyl- and carboxyl-containing acrylic resin (A-1), a melamine resin (A-2), a compound containing at least one alicyclic epoxy group (A-3), a neutralizing agent (A-4), and a coloring pigment (A-5) to form a base coat and applying to the obtained base coat an organic solvent-based clear coating composition (B) which is a clear coating composition (B-1) comprising a mixture of a carboxyl group-containing resin and an epoxy group-containing resin or a clear coating composition (B-2) comprising a resin having a carboxyl group and an epoxy group in one molecule, said clear coating composition (B)

being cured by crosslinking reaction between said carboxyl group and said epoxy group.

2. The method according to claim 1 which is carried out according to a 2-coat 2-bake system comprising applying the base coating composition (A), curing the obtained base coat by heating, applying said clear coating composition (B) to the base coat and curing the obtained clear coat by heating, or according to 2-coat 1-bake system comprising applying the base coating composition (A), applying the clear coating composition (B) to the obtained uncured base coat, and curing the two coats concurrently.

3. The method according to claim 1 wherein the clear coating compositions (B-1) and (B-2) further comprise a vinyl polymer (B—Si) having a hydrolyzable silyl group or having a hydrolyzable silyl group and a hydroxyl group in one molecule.

* * * * *